US010065623B2

(12) United States Patent
Benesh

(10) Patent No.: US 10,065,623 B2
(45) Date of Patent: Sep. 4, 2018

(54) COMPRESSED AIR UNIT OUTPUT PRESSURE VERIFICATION DEVICE

(71) Applicant: Bendix Commercial Vehicle Systems LLC, Elyria, OH (US)

(72) Inventor: Chad J. Benesh, Wakeman, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 589 days.

(21) Appl. No.: 14/223,128

(22) Filed: Mar. 24, 2014

(65) Prior Publication Data

US 2015/0266460 A1 Sep. 24, 2015

(51) Int. Cl.
*B60T 17/22* (2006.01)
*F16D 65/00* (2006.01)
*G01L 19/12* (2006.01)
G01L 5/28 (2006.01)
F04B 51/00 (2006.01)
F04B 41/00 (2006.01)

(52) U.S. Cl.
CPC ........ *B60T 17/221* (2013.01); *F16D 65/0043* (2013.01); *G01L 19/12* (2013.01); *B60T 17/22* (2013.01); *F04B 41/00* (2013.01); *F04B 51/00* (2013.01); *G01L 5/28* (2013.01)

(58) Field of Classification Search
CPC ...... G01L 5/28; B60T 17/221; B60T 2270/88; B60T 17/223; G01B 5/00; F16D 65/0043; F04B 51/00
USPC ..... 73/168, 112.05, 118.02, 1.36, 1.25, 1.26, 73/39, 40.5, 40
See application file for complete search history.

(56) References Cited

U.S. PATENT DOCUMENTS

| 3,321,966 | A | * | 5/1967 | Horner | A01C 23/042 417/286 |
| 4,300,066 | A | * | 11/1981 | Butler, III | G01M 3/3236 165/917 |
| 4,584,876 | A | * | 4/1986 | Aprill, Jr. | G01L 3/26 137/599.11 |
| 4,598,581 | A | * | 7/1986 | Brekke | G01L 19/0007 374/145 |
| 5,517,852 | A | * | 5/1996 | Woodason | G01M 15/14 73/112.03 |

(Continued)

OTHER PUBLICATIONS

Bendix, service data for ST-1 & ST-3 safety valve, Apr. 2004.*

(Continued)

*Primary Examiner* — Manish S Shah
*Assistant Examiner* — Timothy Graves
(74) *Attorney, Agent, or Firm* — Cheryl L. Greenly; Brian E. Kondas; Eugene E. Clair

(57) ABSTRACT

A method and device for testing the output pressure of a compressed air unit is disclosed. A pressure verification device includes a first port configured for attachment to a compressed air unit. A first pressure relief valve is connected to a second port of the pressure verification device and is set to open at a first set pressure. A switching valve is connected to a third port. When the pressure is at least the first set pressure, a path to atmosphere is established from the first port through the first pressure relief valve when the switching valve is in the closed position. In addition, the first pressure relief valve comprises a means for at least one of an audible, a tactile and a visual indicator of the operation of the compressed air unit.

9 Claims, 4 Drawing Sheets

(56) References Cited

U.S. PATENT DOCUMENTS

| | | | |
|---|---|---|---|
| 6,807,855 B2 | 10/2004 | Stroup | |
| 7,278,301 B2* | 10/2007 | McWaid | B82Y 35/00 |
| | | | 73/105 |
| 7,913,558 B2* | 3/2011 | Sarshar | F04B 39/125 |
| | | | 73/168 |
| 8,371,162 B2 | 2/2013 | Miranda et al. | |
| 8,485,222 B2* | 7/2013 | Restivo | F16N 7/40 |
| | | | 123/196 R |
| 2003/0121557 A1* | 7/2003 | Stroup | F04B 41/00 |
| | | | 138/44 |
| 2009/0057442 A1* | 3/2009 | Nguyen | A01C 23/047 |
| | | | 239/302 |
| 2010/0326183 A1* | 12/2010 | Beadie | F04B 51/00 |
| | | | 73/168 |
| 2013/0131873 A1* | 5/2013 | Hamdan | F04B 49/065 |
| | | | 700/282 |

OTHER PUBLICATIONS

SD-03-1901, "Bendix ST-1 and ST-3 Safety Valve Service Data Sheet," Apr. 2004, 4 pages, Bendix Commercial Vehicle Systems LLC, Elyria Ohio U.S.A.

SD-01-690, "Bendix BA-921 Compressor: Standard and Closed Room," Oct. 2007, 40 pages, Bendix Commercial Vehicle Systems LLC, Elyria Ohio U.S.A.

* cited by examiner

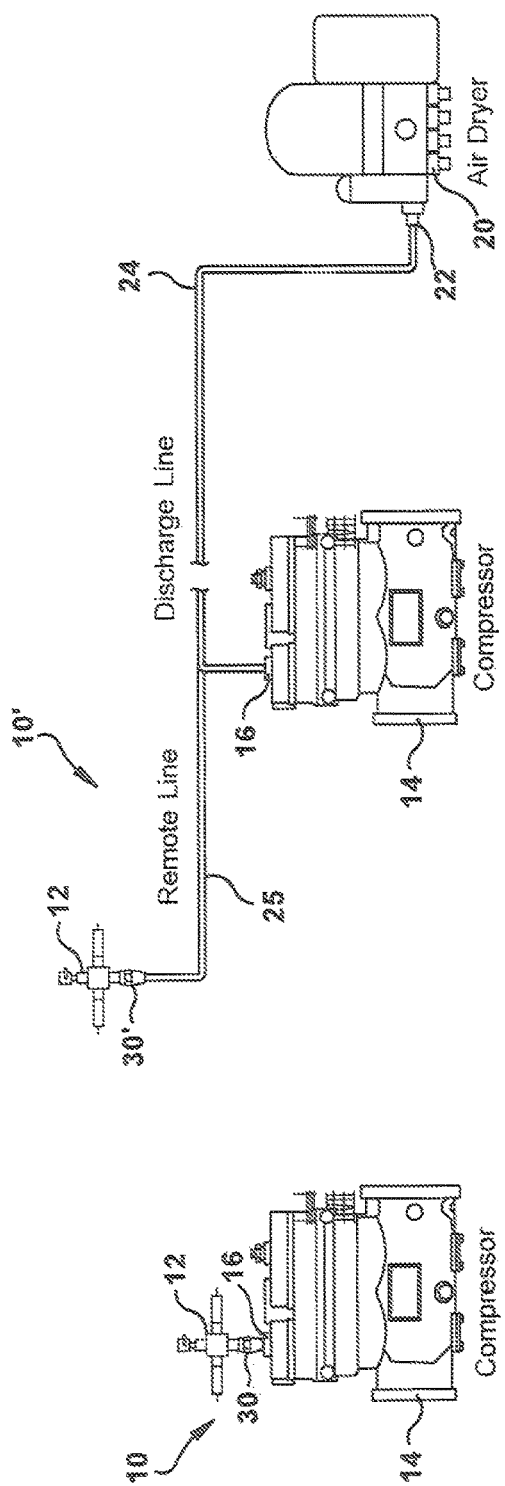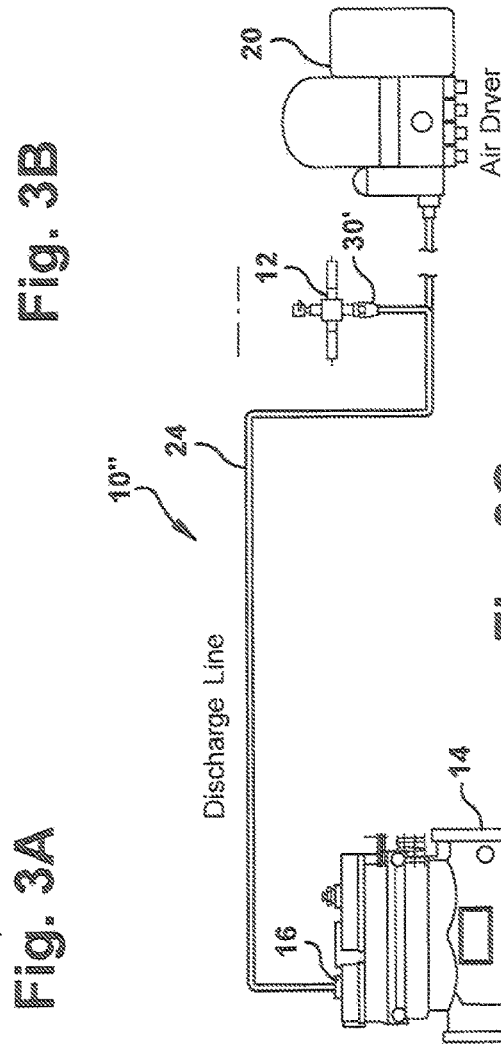

COMPRESSED AIR UNIT OUTPUT PRESSURE VERIFICATION DEVICE

BACKGROUND

Air brake and other auxiliary systems requiring compressed air are known for tractor/trailer vehicles. In conventional tractor/trailer vehicles, the basic air system components include an air compressor with a governor valve, an air dryer, a supply reservoir tank, valves for controlling flow of the compressed air to the brake and other auxiliary systems, and wheel mounted brakes and brake chambers. In an air brake system, for example, the compressor furnishes the compressed air for brake operation by compressing atmospheric air.

Typical air brake systems have operating pressures of between 95 psi and 135 psi. If the air brake system compressed air pressure does not reach the system operating pressure or is slow to reach the system operating pressure, the air compressor is generally tested for issues first. There are known expensive and complicated devices for testing the output of the compressor. The other components in the air charging system, such as the discharge line from the compressor or the air dryer, are generally not tested with the expensive test devices, but may be the true cause of the system not building air. Some technicians without the proper tools or diagnostic training may choose to assume that the compressor is faulty and undergo the labor intensive project of removing the compressor from the vehicle for warranty service.

SUMMARY

In one aspect of the present invention, a pressure verification device for testing a vehicle air charging system is provided. The pressure verification device includes a fitting with a plurality of ports and an air passage common to the plurality of ports. The first port of the fitting is configured for attachment to an associated compressed air unit. A first pressure relief valve is connected to a second port of the fitting, the first pressure relief valve set to open at a first set pressure. A switching valve is connected to a third port of the fitting, wherein a path from the first port to atmosphere through the switching valve is established when the switching valve is an open position.

In another aspect of the present invention a method of testing a compressed air unit is provided. A method includes coupling a pressure verification device to an outlet port of a first compressed air unit and setting a switching valve of the pressure verification device to an open position. The method further includes operating a vehicle air compressor to generate pressurized air and setting the switching valve to a closed position while the air compressor is operating. The method further includes monitoring a first pressure relief valve of the pressure verification device for at least one of an audible, a tactile and a visual indication when the pressure at the port of the compressed air unit is at least at a set pressure of the first pressure relief valve.

BRIEF DESCRIPTION OF THE DRAWINGS

The foregoing and other features and advantages of the present invention will become apparent to those skilled in the art to which the present invention relates upon consideration of the following detailed description of embodiments that apply principles of the present invention with reference to the accompanying drawings, wherein:

FIGS. 3A, 3B, 3C illustrate schematic representations of a vehicle air charging system coupled to a pressure verification device, illustrating embodiments of the present invention.

DETAILED DESCRIPTION

Figure 1:
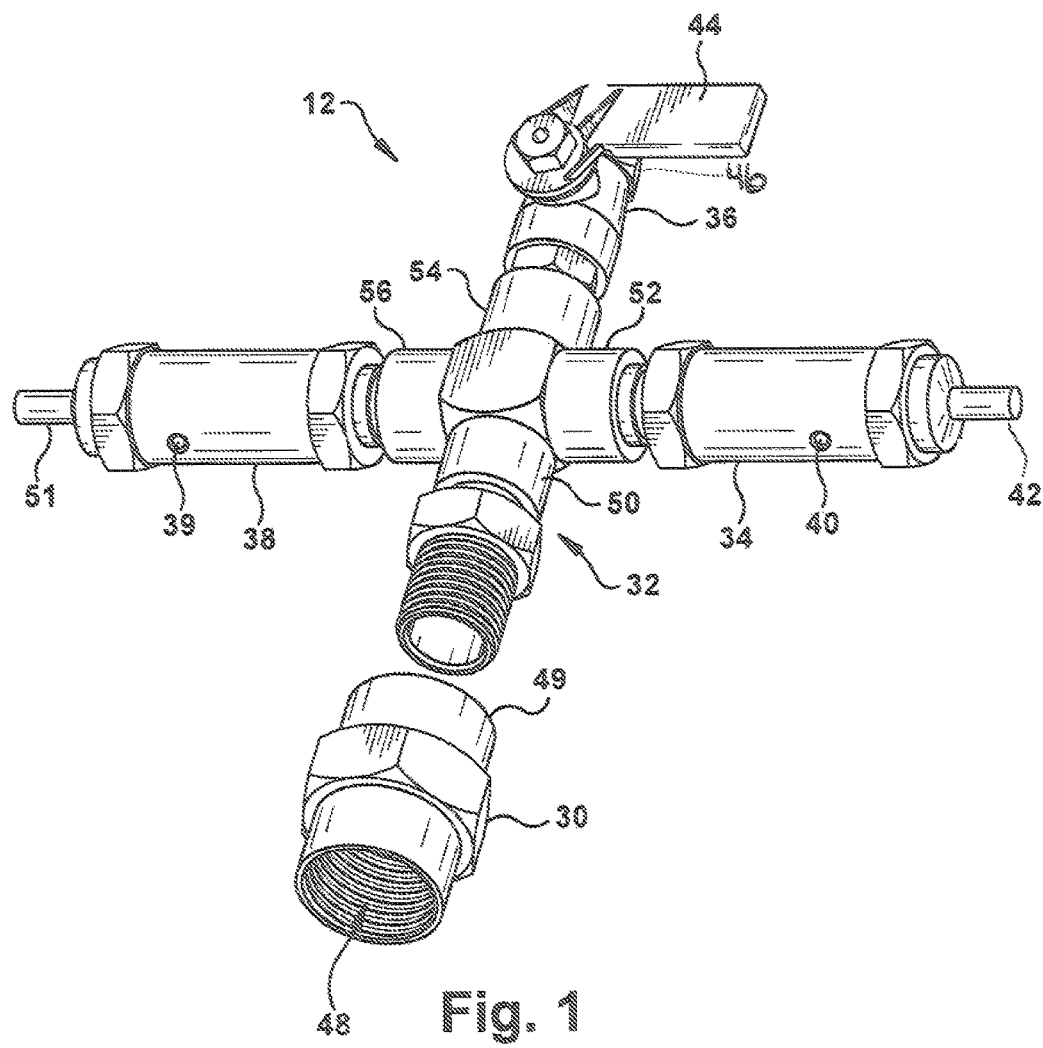
FIG. 1 illustrates a pressure verification device illustrating features of the device, according to an embodiment of the present invention.

With reference to FIG. 1, a pressure verification device 12 for testing a vehicle air charging system is shown. The pressure verification device comprises a fitting 32. The fitting 32 comprises a plurality of ports 50, 52, 54, 56. The fitting 32 includes a single air passage common to all of the ports 50, 52, 54, 56.

A first port 50 of the fitting 32 is configured for either direct attachment to a compressed air unit (not shown) or a mechanism for pneumatically coupling the fitting 32 to the remote compressed air unit. The configuration of the first port 50 of the fitting 32 may include a male threaded portion. Other configurations of the first port 50, such as push-to-connect, are also possible.

A second port 52 of the fitting 32 is configured for connection to a first pressure relief valve 34. The first pressure relief valve 34 may be a ST-1™ safety valve from Bendix Commercial Vehicle Systems LLC. The first pressure relief valve 34 is normally closed and is set to open at a first set pressure. In one example, the first set pressure is approximately equal to the operating pressure of a vehicle air compressor. In another example, the first set pressure is approximately equal to the system operating pressure of an air brake system. In another example, the first set pressure ranges from about 105 psi to about 135 psi.

The first pressure relief valve 34 includes a vent 40 to atmosphere. Pressure in the first pressure relief valve 34 is released to atmosphere when the pressure of compressed air is at least as great as the first set pressure, thereby setting the first pressure relief valve 34 in the open position. Compressed air passing through the relatively small vent 40 creates an audible indication of the pressure in the first pressure relief valve 34 being at least the first set pressure. The pressure passing out of vent 40 can also be a tactile indicator of the pressure in the first pressure relief valve 34 being at least as great as the first set pressure, as a technician can move his hand over the vent 40 and feel the pressurized air passing out of the vent 40.

The first pressure relief valve 34 also includes a piston 42 that moves in response to pressure in the first pressure relief valve 34 being at least the first set pressure. The piston 42 moving from a retracted, or closed, position to an extended, or open, position is both a visual and tactile indicator that the pressure in the first pressure relief valve 34 is at least as great as the first set pressure. In one embodiment, the piston 42 is biased to the retracted position.

A third port 54 of the fitting 32 is configured for connection to a switching valve 36. The switching valve 36 may be a C-5™ drain cock from Bendix Commercial Vehicle Systems LLC. For example, as shown, the switching valve 36 is downstream from the first port 50 and the second port 52. When the switching valve 36 is in the closed position, any pressurized air entering at the first port 50 will still reach the second port 52. The switching valve 36 also includes a manual handle 44. A technician moves the handle 44 of the switching valve 36 to open or close a pathway between the fitting 32 and atmosphere, as the switching valve 36 includes a port 46 that is open to atmosphere. In this example, the switching valve 36 is manual so that the technician will be physically present near the pressure verification device 12 installation so he can sense the audible, visual or tactile indicators of the pressure being at least as great as the first set pressure.

In another example, the switching valve 36 may be a ball valve where when the switching valve 36 is in the open position, a hole in the ball inside the switching valve 36 lines up with the port 46 to open the path to atmosphere. When the switching valve 36 is in the open position, there is a path to atmosphere through the port 46 of the switching valve 36. When the switching valve 36 is in the open position and connected to the fitting 32, a path to atmosphere is established from the first port 50 through the switching valve 36.

The fitting 32 may optionally include a fourth port 56. The fourth port 56 may be configured for connection to a second pressure relief valve 38. The second pressure relief valve 38 may be a ST-1™ safety valve from Bendix Commercial Vehicle Systems LLC. The second pressure relief valve 38 may be similar in structure to the first pressure relief valve 34. However, the second pressure relief valve 38 is set to open at a second set pressure, different from the first set pressure of the first pressure relief valve 34. In one example, the second set pressure ranges from 135 psi to 200 psi. The second pressure relief valve 38 includes a vent 39 to atmosphere, where air in the second pressure relief valve 39 is released to atmosphere when the pressure in the second pressure relief valve 38 is at least as great as the second set pressure. The second pressure relief valve 38 also includes a piston 51 that moves to an extended position in response to the second pressure relief valve 38 being at least as great as the second set pressure.

The pressure verification device 12 may optionally include an adapter 30 that is configured for attachment at a first end 49 to the threaded portion of the first port 50 of the fitting 32. The adaptor 30 is configured for attachment to the compressed air unit or air tubing pneumatic coupling at a second end 48. The second end 48 may be a female threaded portion, push to connect portion or other portion and may be a different size than the first end 49. The adapter 30 allows the fitting 32 to be connected to multiple sizes and configurations of compressed air units or pneumatic couplings.

Figure 2:
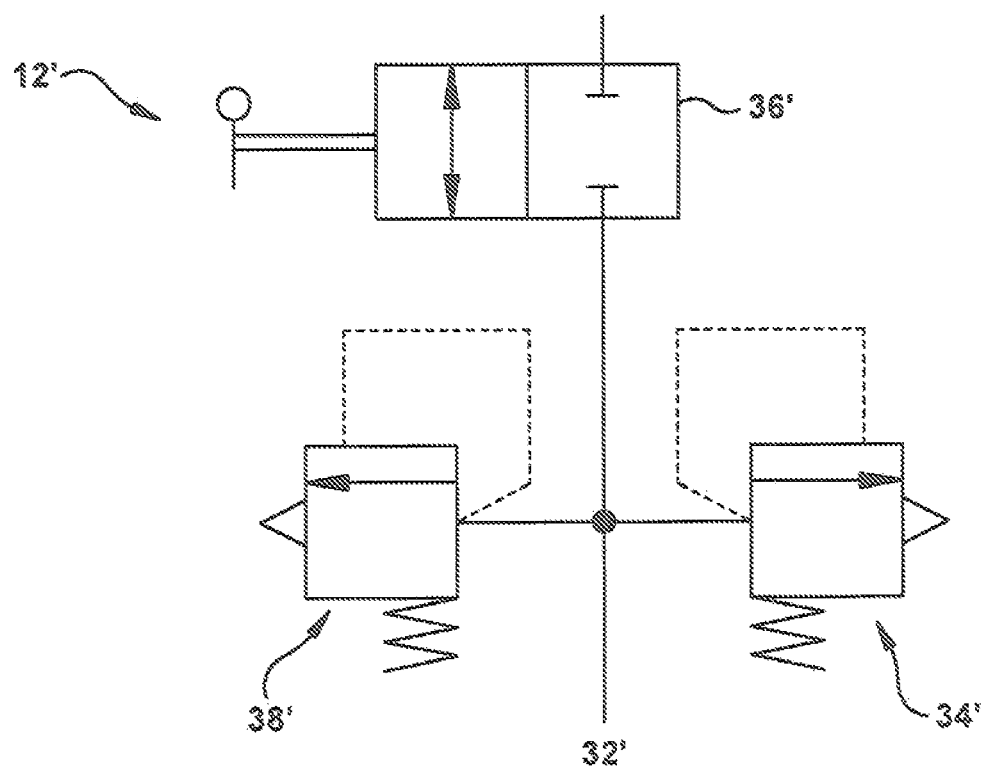
FIG. 2 illustrates a functional representation of a pressure verification device, according to an embodiment of the present invention.

With reference to FIG. 2, a pressure verification device 12' is represented in a single device with all of the functions of the pressure verification device 12 as in FIG. 1. The common portion is represented by line 32'. The first pressure relief function is represented by 34' and is in pneumatic communication with the line 32'. The switching function is represented by 36' and is in pneumatic communication with the line 32'. The optional second pressure relief function is represented by 38' and would be in pneumatic communication with the line 32'. In this manner, the function of the pressure verification device 12' is presented independent of any specific valve structures.

Accordingly, a pressure verification device 12 for testing a vehicle air charging system is provided. The pressure verification device 12 includes a fitting 32 with a plurality of ports 50, 52, 54, 56 and an air passage common to the plurality of ports. The first port 50 of the fitting 32 is configured for attachment to an associated compressed air unit. A first pressure relief valve 34 is connected to a second port 52 of the fitting 32. The first pressure relief valve 34 is normally closed and set to open at a first set pressure. A switching valve 36 is connected to a third port 54 of the fitting 32, wherein a path to atmosphere from the first port 50 through the switching valve 36 is established when the switching valve 36 is in an open position. In one embodiment, the fitting 32 is pneumatically coupled to the associated compressed air unit and pressurized by the associated compressed air unit. A path to atmosphere is established from the first port 50 through the first pressure relief valve 34 when the switching valve 36 is in the closed position and the first pressure relief valve 34 is in the open position, wherein the pressure in the first pressure relief valve 34 is at least as great as the first set pressure. In addition, the first pressure relief valve 34 comprises a means for at least one of an audible, a tactile and a visual indicator of the operation of the associated compressed air unit.

With reference to FIG. 3A, a compressor 14 is shown as part of an air charging system 10. The compressor 14 may be a BA-921® compressor from Bendix Commercial Vehicle Systems LLC. The compressor 14 would typically be mounted on or near the engine of the vehicle (not shown). The pressure verification device 12 is pneumatically connected to the discharge output 16 of the compressor 14 using the adapter 30. This arrangement permits direct testing of the compressor 14 output.

With reference to FIG. 3B, an arrangement of an air charging system 10' with the pressure verification device 12 is shown. The pressure verification device 12 is pneumatically connected to the discharge output 16 of the compressor 14 via a remote line 25. In this configuration, the adapter 30' may be different than the adapter 30 used to connect directly to the compressor 14 as in FIG. 3A. The discharge line 24 is disconnected between the compressor 14 and the input 22 of an air dryer 20. This arrangement permits testing of the compressor 14 when it may not be feasible to connect the pressure verification device 12 directly to the discharge port 16 of the compressor 14. This arrangement does not test the discharge line 24 directly.

With reference to FIG. 3C, an arrangement of an air charging system 10" with the pressure verification device 12 is shown. In this embodiment, the discharge line 24 remains connected to the compressor 14 but the pneumatic connection between the discharge line 24 and the air dryer 20 is removed. The pressure verification device 12 is connected to the discharge line 24 using the adapter 30' approximate to the point where the air dryer 20 was formally connected to the discharge line 24. In this arrangement, the pressure verification device 12 will indicate a problem with either the compressor 14 or the discharge line 24 if the pressure verification device 12 does not give an audible, tactile or visual indicator of the pressure at that point being at least as great as the first set pressure when the compressor 14 is operating. If the testing arrangement as in FIG. 3A or FIG. 3B has already indicated the compressor 14 is compressing air to at least the first set pressure, then the arrangement as in FIG. 3C would be used to determine if there is an issue with the discharge line 24.

Figure 4:
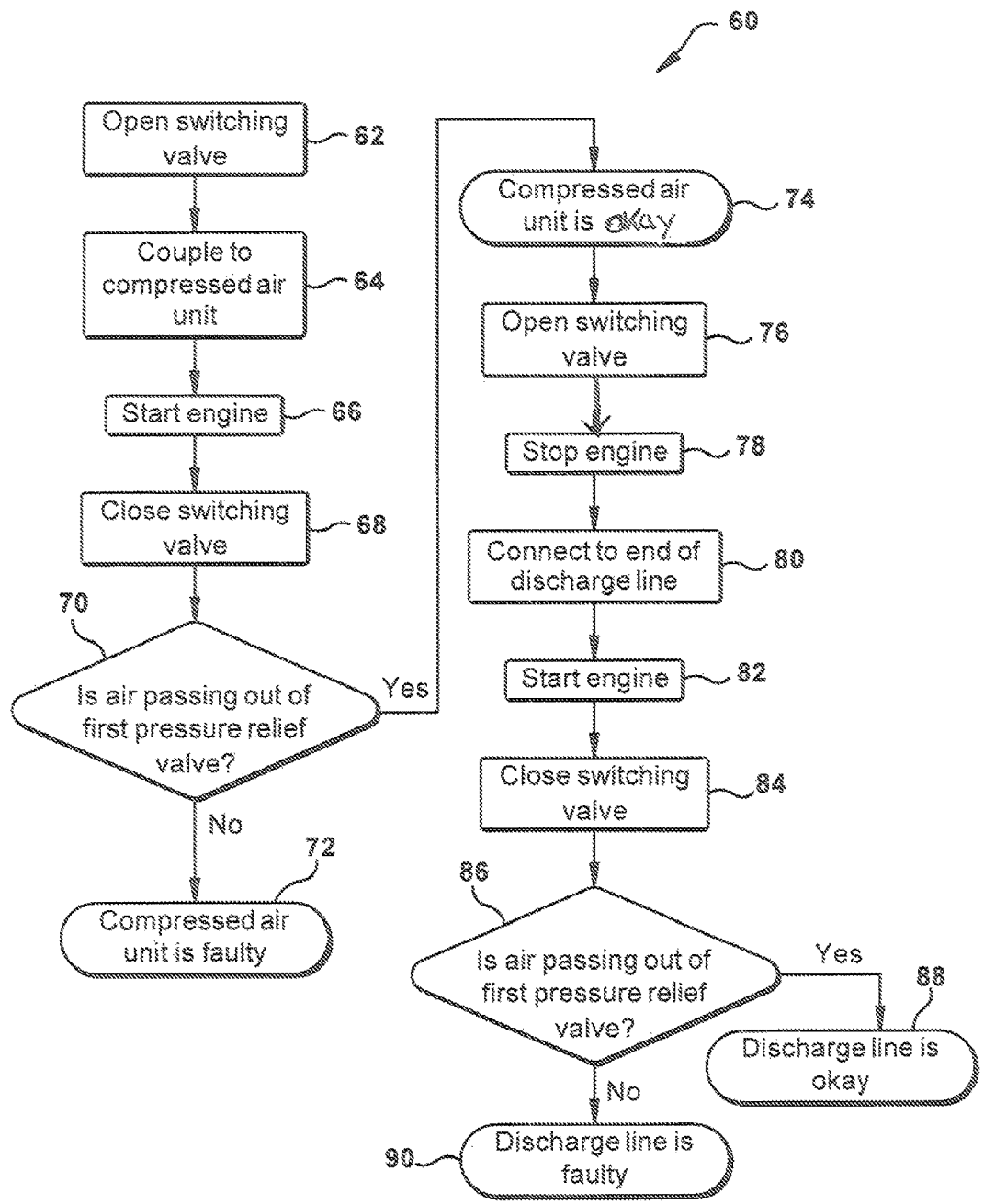
FIG. 4 illustrates a method of implementing the pressure verification device, according to an embodiment of the present invention.

With reference to FIG. 4, a method 60 of testing a compressed air unit of an air charging system using the pressure verification device 12 is shown.

In the first step 62 of method 60, the switching valve 36 would be moved to the open position if the switching valve 36 were already in the closed position. The open position means that the path through the switching valve 36 to atmosphere is opened.

In step 64, the pressure verification device 12 is coupled to the compressed air unit in a manner similar to the configurations shown in FIG. 3A or 3B. In this example, the compressor 14 is the compressed air unit. The pressure verification device 12 is coupled either directly or remotely to the discharge port 16 of the compressor 14. Since the pressure verification device 12 is still open to atmosphere, a path from the discharge port 16 to atmosphere is established through the pressure verification device 12. Since the port 46 of the switching valve 36 is open to atmosphere, any contamination will be released to atmosphere rather than contaminating the first pressure relief valve 34. In addition, any pressurized air trapped in the compressor 14 would not cause the first pressure relief valve 34 to prematurely be set in the open position.

In step 66, the engine to which the compressor 14 is connected is started. Since the pressure verification device 12 is open, any contaminants or trapped pressure from the compressor 14 would be released to atmosphere through the pressure verification device 12. The compressor 14, if operating property, would begin to compress air. The compressed air will pass out to atmosphere through the pressure verification device 12 as long as the switching valve 36 is open.

In step 68, the switching valve 36 is closed manually. When the switching valve 36 is closed, the path to atmosphere through the switching valve 36 is closed.

In step 70, the technician determines if the compressed air is being released through the first pressure relief valve 34 through the visual, tactile or audible means on the first pressure relief valve 34. If the compressed air is at least as great as the first set pressure, the visual, tactile or audible means will confirm that the compressor 14 is delivering compressed air at the desired pressure. In one example, the first set pressure is a vehicle air compressor operating pressure. In another example, the first set pressure ranges from 105 psi to 135 psi. In another example, the first set pressure is about 120 psi. The method continues to step 74.

However, if no air is passing out of the first pressure relief valve 34 as determined by the technician using the visual, tactile or audible means, the compressed air unit is determined to be faulty in step 72 because the compressed air from the compressed air unit is not at or greater than the first set pressure. No further tests will need to be run using the pressure verification device 12.

In step 74, the technician can assume that the compressed air unit is operating correctly because the compressed air pressure as measured by the pressure verification device 12 is at least as great as the first set pressure. The next step is to check the discharge line 24. The switching valve 36 is manually opened in step 76 and the engine is shut off is step 78.

In step 80, the technician connects the pressure verification device 12 as indicated in FIG. 3C. The air dryer 20 would be disconnected from the discharge line 24 and the pressure verification device 12 would be connected to the end of the discharge line 24 nearest to the air dryer 20.

In step 82, the engine would be re-started. Since the switching valve 36 is in the open position, any contaminants or air trapped in the discharge line 24 would be expelled to atmosphere. The switching valve 36 is then manually moved to the closed position in step 84.

In step 86, the technician determines if the compressed air is being released through the first pressure relief valve 34 through the visual, tactile or audible means on the first pressure relief valve 34. If the compressed air is at least as great as the first set pressure, the visual, tactile or audible means on the pressure verification device 12 will confirm that the compressed air unit is delivering compressed air through the discharge line 24 at the desired pressure. In one example, the first set pressure is a vehicle air compressor operating pressure. In another example, the first set pressure ranges from 105 psi to 135 psi. In another example, the first set pressure is about 120 psi. In step 88, the technician can determine that the discharge line 24 is okay because the pressure reaching the pressure verification device 12 is at least as great as the first set pressure. No further testing with the pressure verification device 12 would be done.

If no air is passing out of the first pressure relief valve 34 as determined by the technician in step 86 using the visual, tactile or audible means, the compressed air unit is determined to be faulty in step 90 because the compressed air from the compressed air unit is not at least as great as the first set pressure. No further tests will need to be run using the pressure verification device 12.

In another embodiment, the second pressure relief valve 38 is connected to the pressure verification device 12 to ensure that the pressurized air does not exceed the operating limits, since the air is being compressed into the small volume of the pressure verification device 12. In one example, the second set pressure ranges from about 150 psi to about 200 psi, greater than the first set pressure. The second pressure relief valve 38 will allow air to pass to atmosphere when the pressurized air is at least as great as the second set pressure if the first pressure relief valve 34 is malfunctioning.

Accordingly, a method 60 of testing a compressed air unit with a pressure verification device 12 is provided. In one embodiment, step 62 of method 60 includes setting a switching valve 36 of the pressure verification device 12 to an open position if the switching valve 36 was in a closed position. Step 64 includes coupling the pressure verification device 12 to an outlet port 16 of a first compressed air unit. Step 66 includes operating a vehicle air compressor 14 to generate pressurized air. Step 68 includes setting the switching valve 36 to a closed position. The method 60 further includes monitoring a first pressure relief valve 34 of the pressure verification device 12 for at least one of an audible, a tactile and a visual indication of the pressure being at least as great as a set pressure of the first pressure relief valve 34. If there is no audible, tactile and visual indication of the pressure being at least the set pressure, then the technician can determine that the compressor 14 is faulty in step 72.

In another example, a method 60 continues with testing the compressed air unit and a discharge line 24. In step 74, the switching valve 36 is opened. Step 76 includes setting the switching valve 36 of the pressure verification device 12 to an open position. The engine is stopped in step 78 so that the vehicle air compressor 14 is no longer compressing air. The pressure verification device 12 is de-coupled from the outlet port 16 of the first compressed air unit. Step 80 includes coupling the pressure verification device 12 to a pneumatic discharge line 24 that is connected to the outlet port 16 of the first compressed air unit. Step 82 includes operating the engine with the vehicle air compressor 14. Step 84 includes setting the switching valve 36 to a closed position. In step 86, the technician monitors the first pressure relief valve 34 of the pressure verification device 12 for at least one of an audible, a tactile and a visual indication of the pressure through the pneumatic discharge line 24 being at least the set pressure of the first pressure relief valve 34. If there is no audible, tactile and visual indication of the pressure being at least the set pressure, then the technician can determine that the discharge line 24 is faulty in step 90.

The pressure verification device 12 can be provided as a kit for testing the vehicle air charging system. The kit includes a fitting 32 with a plurality of ports 50, 52, 54, 56 and an air passage common to the plurality of ports. In one embodiment, the fitting 32 is a tee-shaped fitting. The first port 50 of the fitting 32 is configured for attachment to an associated compressed air unit. The kit includes a first pressure relief valve 34 configured for attachment to the second port 52 of the fitting 32. The first pressure relief valve 34 is normally closed and set to open at a first set pressure. The kit includes a switching valve 36 configured for attachment to the third port 54 of the fitting 32, wherein a path to atmosphere from the first port 50 through the switching valve 36 is established when the switching valve 36 is in an open position. In one embodiment, the kit includes a second pressure relief valve 38 configured for attachment to the fourth port 56. The second pressure relief valve 38 is normally closed and set to open at a second set pressure. In another embodiment, the kit includes an adapter 30 configured for attachment between the first port 50 of the fitting 32 and the associated compressed air unit. The adapter 30 may be configured for direct connection to the compressed air unit, as shown in FIG. 3A or the adapter 30' may be configured for connection to pneumatic tubing, as shown in FIGS. 3B, 3C. In another embodiment, the kit includes pneumatic tubing for coupling the pressure verification device 12 to the associated compressed air unit, such as the remote line 24 in FIG. 3B.

While the present invention has been illustrated by the description of embodiments described above, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept.

I claim:

1. A pressure verification device for testing a vehicle air charging System comprising: a fitting, the fitting comprising a plurality of ports and defining an air passage common to the plurality of ports, a first port of the fitting pneumatically coupled to and pressurized by an associated compressed air unit; a first pressure relief valve having an air vent and connected to a second port of the fitting, wherein the device is configured to open a path directly to atmosphere through the air vent in response to the pressure in the first pressure relief valve being at least as great as a first set pressure; and a switching valve connected to a third port of the fitting, wherein the device is configured to open a path to atmosphere from the first port through the switching valve in response to the switching valve being in an open position, and the device is configured to open a path directly to atmosphere from the first port through the air vent in response to the switching valve being in the closed position and a pressure in the first pressure relief valve being at least as great as the first set pressure; and a second pressure relief valve having a second air vent and connected to a fourth port of the fitting, wherein the device is configured to open a path directly to atmosphere through the second air vent in response to the pressure in the second pressure relief valve being at least as great as a second set pressure which is greater than the first set pressure.

2. The pressure verification device as in claim 1, wherein the first pressure relief valve in the open position comprises a means for indicating the operation of the associated compressed air unit.

3. The pressure verification device as in claim 1, wherein air passing through the vent in the first pressure relief valve at at least the first set pressure generates an audible indicator of the operation of the associated compressed air unit.

4. The pressure verification device as in claim 1, wherein the first pressure relief valve comprises a piston, wherein the piston moves from a retracted position to an extended position at at least the first set pressure and generates a visual indicator of the operation of the associated compressed air unit.

5. The pressure verification device as in claim 1, wherein the first set pressure is approximately equal to the operating pressure of a vehicle air compressor.

6. The pressure verification device as in claim 1, wherein the first set pressure ranges from about 105 psi to about 135 psi.

7. The pressure verification device as in claim 1 further comprising: a second pressure relief valve connected to a fourth port of the fitting, wherein the second relief valve is set to open at a second set pressure.

8. The pressure verification device as in claim 7, wherein the second set pressure ranges from about 135 psi to about 200 psi.

9. The pressure verification device as in claim 1, wherein the switching valve comprises a handle for opening and closing the switching valve manually.

\* \* \* \* \*